US012646494B2

(12) United States Patent
Moss

(10) Patent No.: US 12,646,494 B2
(45) Date of Patent: Jun. 2, 2026

(54) ATTACHING HAND-ACTUATED MUSIC CONTROLLERS TO A SAXOPHONE

(71) Applicant: William Michael Moss, West Roxbury, MA (US)

(72) Inventor: William Michael Moss, West Roxbury, MA (US)

(*) Notice: Subject to any disclaimer, the term of this patent is extended or adjusted under 35 U.S.C. 154(b) by 977 days.

(21) Appl. No.: 17/828,184

(22) Filed: May 31, 2022

(65) Prior Publication Data

US 2023/0012611 A1 Jan. 19, 2023

Related U.S. Application Data

(60) Provisional application No. 63/194,661, filed on May 28, 2021.

(51) Int. Cl.

| | |
|---|---|
| ***G10H 1/34*** | (2006.01) |
| ***G10D 7/08*** | (2006.01) |
| ***G10D 9/00*** | (2020.01) |
| ***G10G 5/00*** | (2006.01) |
| ***G10H 1/00*** | (2006.01) |

(52) U.S. Cl.

CPC ................. *G10H 1/34* (2013.01); *G10D 7/08* (2013.01); *G10D 9/00* (2013.01); *G10G 5/005* (2013.01); *G10H 1/0008* (2013.01); *G10H 1/0083* (2013.01); *G10H 2220/221* (2013.01); *G10H 2240/281* (2013.01)

(58) Field of Classification Search

CPC ...... G10H 1/34; G10H 1/0008; G10H 1/0083; G10H 2220/221; G10H 2240/281; G10D 7/08; G10D 9/00; G10G 5/005

See application file for complete search history.

(56) References Cited

U.S. PATENT DOCUMENTS

| | | | | |
|---|---|---|---|---|
| 3,192,817 A * | 7/1965 | Schmidt | G10G 5/00 | 84/327 |
| 4,099,442 A * | 7/1978 | Amadio | G10D 7/066 | 84/382 |
| 4,348,935 A * | 9/1982 | Bay | G10D 9/00 | 84/382 |

(Continued)

*Primary Examiner* — Jeffrey Donels
*Assistant Examiner* — Philip G Scoles
(74) *Attorney, Agent, or Firm* — Brian M. Dingman; Prince Lobel Tye LLP

(57) ABSTRACT

The presence of saxophonists furthering their musical horizons by playing keyboard instruments inspires the invention of a novel device to connect a light-weight keyboard or MIDI grid controller to a saxophone to facilitate the convenient and rapid switching between playing either instrument. Battery power and Bluetooth technology combine with innovations in plastics technology to facilitate the creation of strong, lightweight structures to facilitate such a device. With the addition of looping software on a laptop computer, a saxophonist so equipped can create music to accompany themselves, obviating the need for other musicians to function as a musical ensemble. This innovation may be the harbinger for other musicians on other single note instruments—trumpet, trombone, violin, etc. to join this trend using either instrument-attached, strap-on or wearable keyboards. This could blend the boundaries between acoustic and electronic instruments, and increase the enjoyment and musical enrichment of musicians and audiences alike.

19 Claims, 12 Drawing Sheets

(56) References Cited

U.S. PATENT DOCUMENTS

| | | | | |
|---|---|---|---|---|
| 5,388,493 | A * | 2/1995 | Curletto | G10H 1/0066<br>84/376 A |
| 6,329,582 | B1 * | 12/2001 | Catalano, Jr. | G10H 1/34<br>84/327 |
| 2010/0257702 | A1 * | 10/2010 | Fritskey | F16L 33/04<br>24/20 R |
| 2011/0273700 | A1 * | 11/2011 | Lambert | G10H 1/34<br>356/28 |

* cited by examiner

ATTACHING HAND-ACTUATED MUSIC CONTROLLERS TO A SAXOPHONE

CROSS-REFERENCE TO RELATED APPLICATION

This application claims priority of Provisional Application 63/194,661 filed on May 28, 2021.

BACKGROUND

Saxophone players often play other instruments as part of their musical performances, especially among the keyboard family. Pianos, organs and synthesizers are common. These instruments are placed on stands, which limit the mobility of the sax player when on stage.

Limits in the size of stages presents a problem to saxophone/keyboard players, as nightclub owners seek to optimize audience capacity.

Wiring for these keyboard instruments also poses a problem, in the form of set-up and take-down burden and poses a tripping hazard underfoot. Wear on the wiring from repeated footfalls and from rollover from amplifier wheels also causes difficulty. The wear on this wiring causes unreliability due to failure of wires and connectors. The tripping hazard poses a liability to the saxophone/keyboard player's personal safety, and to the safety of those around him; musician and audience member alike. The time setting up and taking down the wiring in effect reduces the saxophone/keyboard player's pay by causing him to spend additional time at each music gig.

SUMMARY

All examples and features mentioned below can be combined in any technically possible way.

In one aspect, an apparatus for attaching a saxophone and a hand actuated music controller includes a support framework, wherein the support framework comprises a first plurality of coupling structures constructed and arranged to removably clamp the saxophone to the support framework, and a second plurality of coupling structures to removable couple the hand actuated controller to the support framework.

Embodiments may include one of the following features, or any combination thereof. The first plurality of coupling structures comprises circumferential clamps to facilitate the attachment of support framework to the saxophone. The at least one of the circumferential clamps comprises anti-rotation features to keep the at least one circumferential clamp from rotating relative to the saxophone. The at least one of the circumferential clamps comprises a beveled, radiused or smoothed edge. The first plurality of coupling structures comprises at least two circumferential clamps. The circumferential clamps are formed from a plurality of semi-circular sections. The first plurality of coupling structures comprises a quick-release mechanism to facilitate the removal of the hand actuated controller from the framework. The second plurality of coupling structures comprises a quick-release mechanism to facilitate the removal of the hand actuated controller from the framework.

The support framework further comprises an attachment eye for attaching a neck strap to the support framework. The location of the attachment eye on the support framework is adjustable. The location of the eye is adjusted by choosing at least one hole in the support framework in which to locate the attachment eye. The attachment eye is located in line with the center of mass of a combined assembly comprising the support framework, the saxophone and the hand actuated controller, to facilitate rotating the combined assembly about the attachment eye. The attachment eye is located at the center of mass of a combined assembly comprising the support framework, the saxophone and the hand actuated controller.

The hand actuated controller is a keyboard. The keyboard comprises unweighted keys. The keyboard is lightweighted. The keyboard comprises a wireless data connection to sound synthesis and/or sound amplification equipment.

The position of the saxophone relative to the support framework is adjustable. The position of the hand actuated controller relative to the support framework is adjustable.

In one aspect, a method for using a saxophone and a hand actuated controller by a musician includes adjusting a relative position of the saxophone to a support framework, coupling the saxophone and the hand actuated controller to the support framework, placing a neck strap around a neck of the musician, attaching the neck strap to the support framework at an attachment point, and rotating the framework about the attachment point to position either the saxophone or the hand actuated controller in a proper orientation for playing by the musician.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Figure 1:
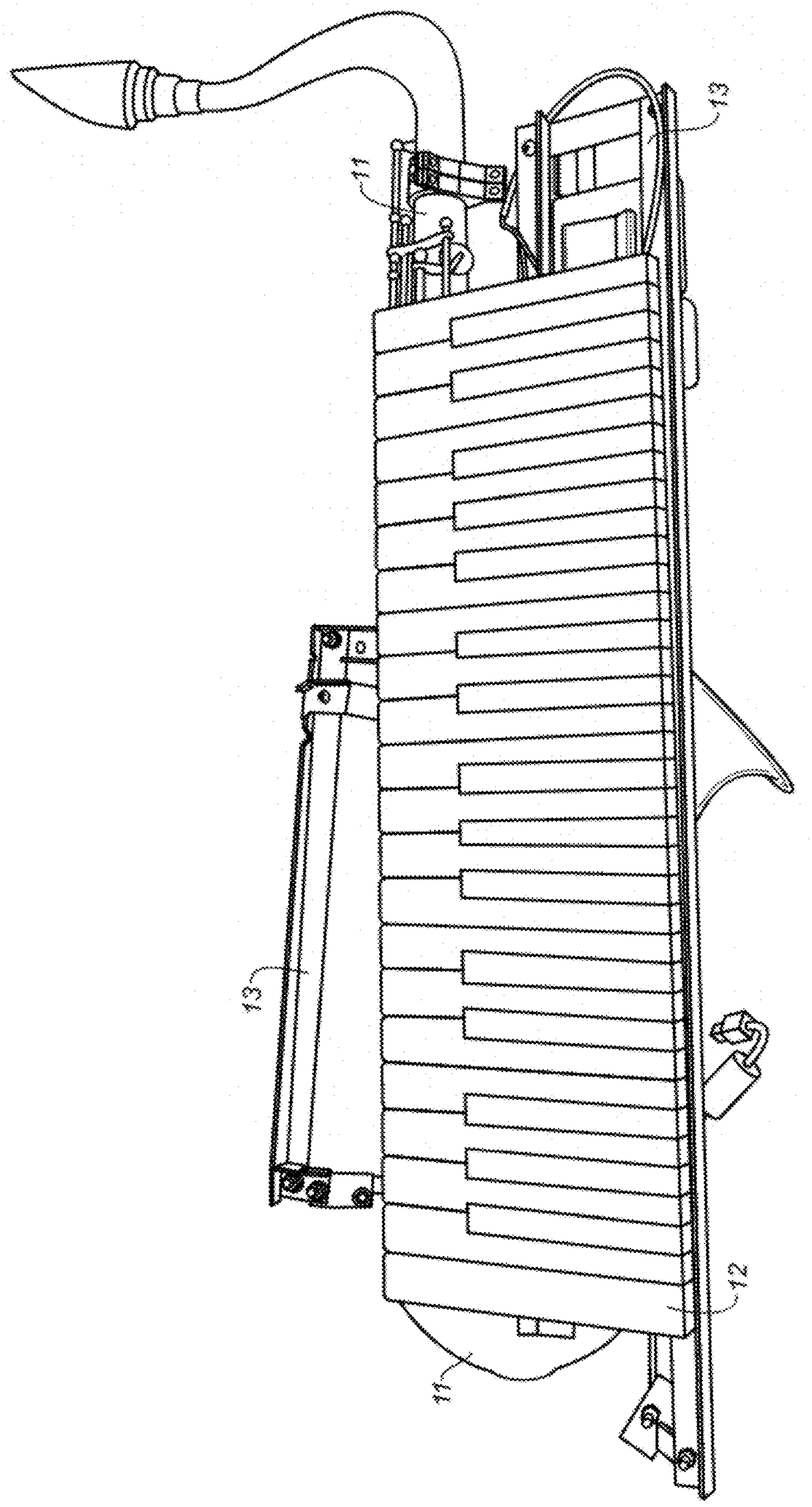
FIG. 1 depicts one example device shown from the player's right.

The terminology used herein is for the purpose of describing particular embodiments only and is not intended to be limiting of the invention. As used herein, the term and/or includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification specify the presence of stated features, steps, operations, elements and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The present disclosure is to be considered an exemplification of the invention and is not intended to limit the invention to the specific embodiments illustrated by the figures or description below.

Examples of the methods, systems, and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In response to the problem of saxophone players increasingly being called upon to play keyboard instruments or utilize other hand actuated controllers in bands, and the difficulties caused by fixed keyboard stands with attendant wiring, in some examples keyboard or other hand actuated controller equipment (generically referred to as a keyboard going forward for ease of description) needed for the sax player to play is mechanically coupled to the sax. The mechanically coupled keyboard equipment should have sufficiently low enough mass so as not encumber the saxophone. In some examples, the attached keyboard equipment is battery-powered and connected via any known type of wireless data connection using any suitable communication protocol, such as Bluetooth, various flavors of 802.11 wi-fi, or other known methods, to the sound creation and amplification equipment needed for the function of this instrument. With this system, there are no wires to set up, become damaged or pose a tripping hazard. The sax player therefore regains full mobility and uses no more of a stage footprint than they did before adding playing keyboards to their list of musical duties.

The delicate brass tubing of a saxophone does not have sufficient strength to support the framework for coupling a keyboard, the keyboard itself and any associated electronics. Saxophones incorporate a brass ring that provides a structure for a strap that hangs around the player's neck to connect to and hold the saxophone in its proper location for playing. This brass ring does not have sufficient strength to withstand the added weight of the added gear. Supporting this extra gear from the brass ring can cause it to wear rapidly or fail prematurely.

Additionally, if the keyboard were to be supported from the brass ring on the saxophone, the added weight of the keyboard and electronics mounted on the right side of the instrument (from the player's perspective) will cause the instrument to tilt, throwing off the angle at which the players fingers rest on the saxophone to play. This situation would be untenable, because players spend a lifetime getting used to a certain angle of the instrument. Disturbing the spatial relationship between the instrument and the player would destroy the player's finger technique.

In some examples, a framework provides support for both the saxophone and keyboard (and possibly other related electronics). The neck strap that the player would normally use to connect to the ring on the sax to hold the sax in place now is connected to the framework, which supports the sax and the keyboard. The neck strap no longer directly connects to the instrument, it connects to an instrument support framework that supports multiple instruments. That is, a player uses a neck strap wrapped around their neck to hold an instrument support framework. Though the examples depicted in the figures show the instruments coupled to the instrument support framework as being a saxophone and a keyboard, any equipment the sax player might wish to carry with them while playing could be coupled to the framework, and examples disclosed herein are not limited to the specific devices that are depicted coupled to the framework with the saxophone.

In some examples, the attachment point of the neck strap to the instrument support framework is adjustable. When the strap is attached to the framework, the framework should be oriented such that the instruments coupled to it are both at desired orientations relative to the player to facilitate playing.

In some examples, the location of the connection strap to the framework is adjustable, and a relationship of the saxophone to the framework is adjustable. The support framework can provide an adjustable attachment point for the instrument (preferably the saxophone), so it can be placed at its proper balance point. The location of the connection strap to the instrument can be adjusted so that the connection point is located at approximately the center of mass of the combined framework plus attached instruments. In some examples, the attachment point is adjusted to be aligned with the center of mass of the combined framework and instruments along an imaginary horizontal axis passing through the musician front to back, so that the assembly can be easily pivoted about this axis by the musician to rotate the different instruments into a desired location for playing without having to apply significant torque about the axis. In some examples, the attachment point is at the center of mass of the combined of the combined framework and instrument assembly. In some examples, both the position of the saxophone and the position of the added instrument, which may be a keyboard, are adjustable relative to the support framework, and the location of the strap connection point to the framework is adjustable.

FIGS. 1-6 depict various views of one example of support framework 13 with attached saxophone 11 and keyboard 12. Saxophone 11 is coupled to support framework 13 at multiple locations. The coupling allows the relative position of saxophone 11 to framework 13 to be adjusted, but once adjusted the saxophone is fixed in place for playing. Though one particular arrangement for coupling saxophone 11 to framework 13 is shown, other configurations to couple saxophone 11 to framework 13 are possible and this disclosure is not limited to the particular arrangement of coupling points and clamps shown. A coupling mechanism should allow relative position of the saxophone with respect to the framework to be adjusted by the player, and once that relative position is determined the coupling should be capable of being fixed so that it does not shift while playing.

Figure 2:
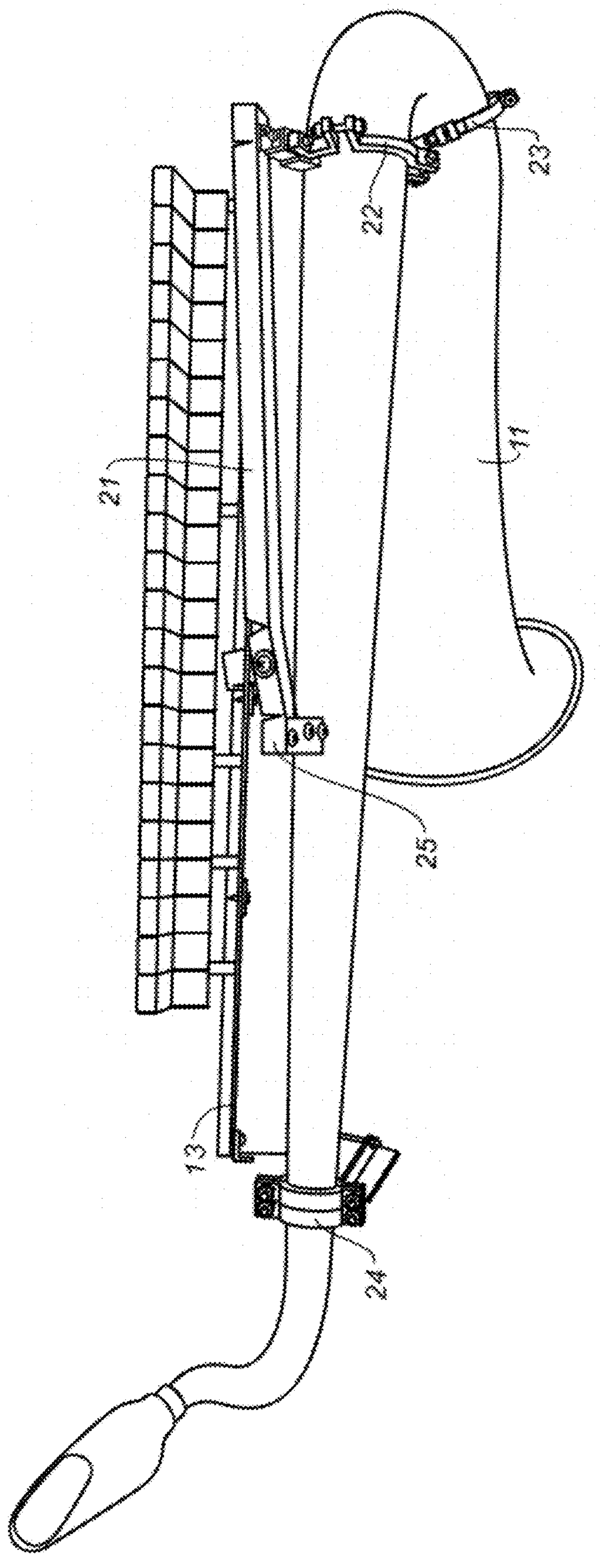
FIG. 2 depicts the example of FIG. 1 shown from the players left.

Referring now to FIG. 2, various attachment points of saxophone 11 to framework 13 are depicted. Clamps 22 and 23 attach to lower sections of sax 11 and are coupled to the framework 13 via struts which are shown in more detail in FIGS. 4, 6 and 10. Clamp 24 couples the upper portion of sax 11 to framework 13 via strut 51 (shown in FIG. 5). Top strut 21 supports the saxophone 11 from the saxophone's strap ring 25. This attachment is more clearly visible in FIG. 5. In some examples, there are more coupling connections between saxophone 11 and framework 13 than might be strictly necessary to fix the relative position of the saxophone to the framework. Multiple coupling locations are used to distribute loads over larger and separated areas of the instrument. The walls of the saxophone are made of thin brass which lacks sufficient mechanical strength to support coupling in just a single location without risk of damage. By using at least two clamps and coupling the framework to the strap ring of the sax, which is designed to at least support the saxophone itself, any loads coupled from the framework into the sax are distributed over larger and multiple, separate areas of the instrument walls, lessening the chances of damaging the thin brass walls. In some examples, three generally circular, circumferential clamps formed from multiple clamp sections couple the saxophone to the framework in combination with coupling the sax strap ring to the framework.

Figure 3:
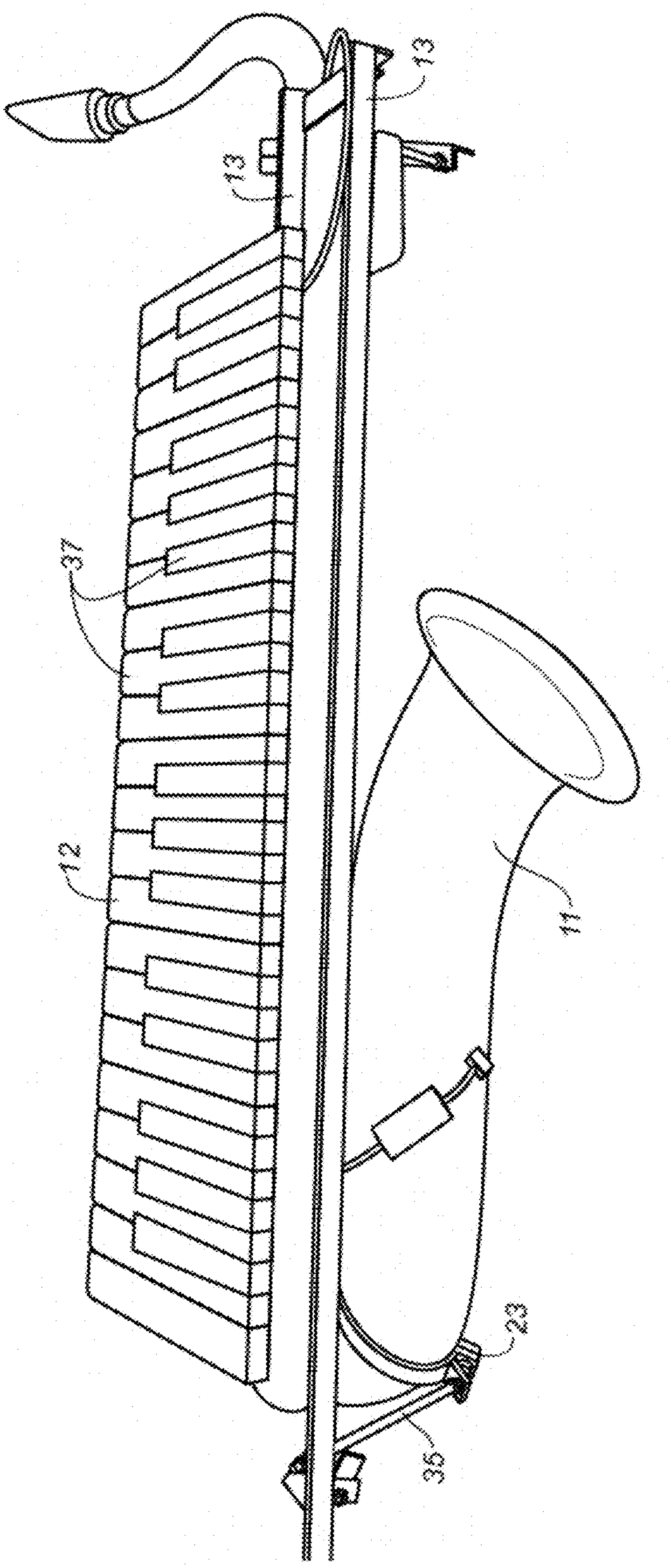
FIG. 3 depicts detail of the framework shown from player's right.

FIG. 3 depicts another view of one example support framework with attached saxophone and hand actuated controller which is depicted as a keyboard. The left side of FIG. 3 shows the connection of the framework 13 to the saxophone 11 via the clamp 23 which fits around a lower section of saxophone 11 and connection strut 35. The keyboard 12 is also shown coupled to support framework 13. In some examples, the position of the hand actuated controller with respect to the support framework is adjustable. In some examples, the hand actuated controller is coupled to the support framework via quick release fasteners.

In some examples, a particular keyboard may be used. Since the weight of the complete assembly is supported around the musician's neck via a neck strap, minimizing the mass of all attached components substantially improves comfort and playability. In some examples, the keyboard is light weighted. While in many instances keys 37 on a keyboard are weighted to improve a feel and playability of the keyboard, the extra weight can be detrimental when using the framework with a coupled saxophone. In some examples, keyboard keys 37 are not weighted, and keys 37 are further made from low density materials. Keys may be made from low density thermoplastic or thermoset polymers, as long as the polymers have sufficient modulus to withstand applied forces in use. Foamed polymers are also possible which can further reduce density (and therefore mass). For example, keys can be molded using the uCell micro cellular foam injection mold process available from Trexel, Inc. of Wilmington, MA. Other known materials are also possible, including metals such as aluminum or titanium. In some examples, the keyboard can be fabricated as part of the support framework, to reduce redundant structural parts and to save weight. In some examples, the keyboard will incorporate adjustment of key spring tension, so that the spring tension of the keyboard can be adjusted to more closely match that of the saxophone.

Figure 4:
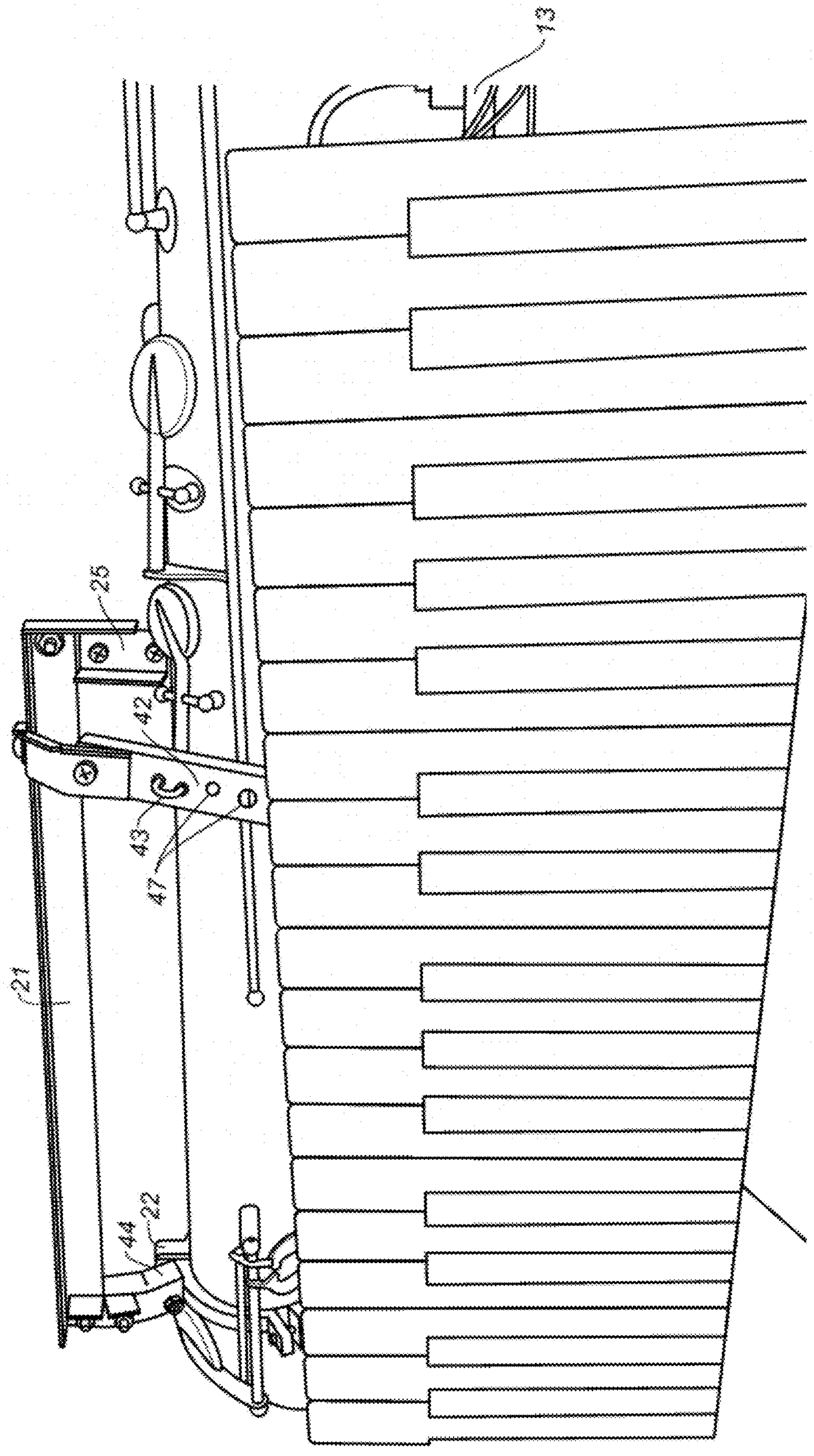
FIG. 4 depicts detail of the top strut.

FIG. 4 depicts top strut 21 attached to strap attachment eye 25 at the middle of the saxophone. Numerous known mechanical fasteners could be used to couple the top strut to the saxophone, such as a threaded fastener and nut, a quick release fastener, snaps or any other suitable mechanical fastener. In some examples, top strut 21 is coupled to clamp 22 with mechanical fastener 44, which can be a threaded fastener with nut, a quick release fastener, snaps or any other suitable mechanical fastener. Mid strut 42 fastens to both the top strut 21 and to frame rails of framework 13 that support the keyboard and contains the new strap attachment eye 43. The location of strap attachment eye 43 along mid strut 42 can be adjusted by locating eye 43 in various holes 47 drilled this strut 42. Though in this example adjustment is made by selecting the holes in which to locate the eye, though other adjustment mechanisms are contemplated herein and examples are not limited to the adjustment mechanism depicted. For example, an attachment eye could be located on a threaded rod coupled to mid strut 42, and it's position adjusted by rotating the eye with respect to the threaded rod to alter the position along the length of the threaded rod. The mid strut 42 can also be made adjustable to the right or left, to accommodate different balance points caused by mounting different models or styles of hand actuated music controllers to the support framework. The strap attachment eye should be easily moveable to pivot the entire device about this balance point to facilitate easy switching from playing the keyboard to playing the saxophone. The relative playing positions are shown in more detail in FIGS. 11 and 12.

Figure 5:
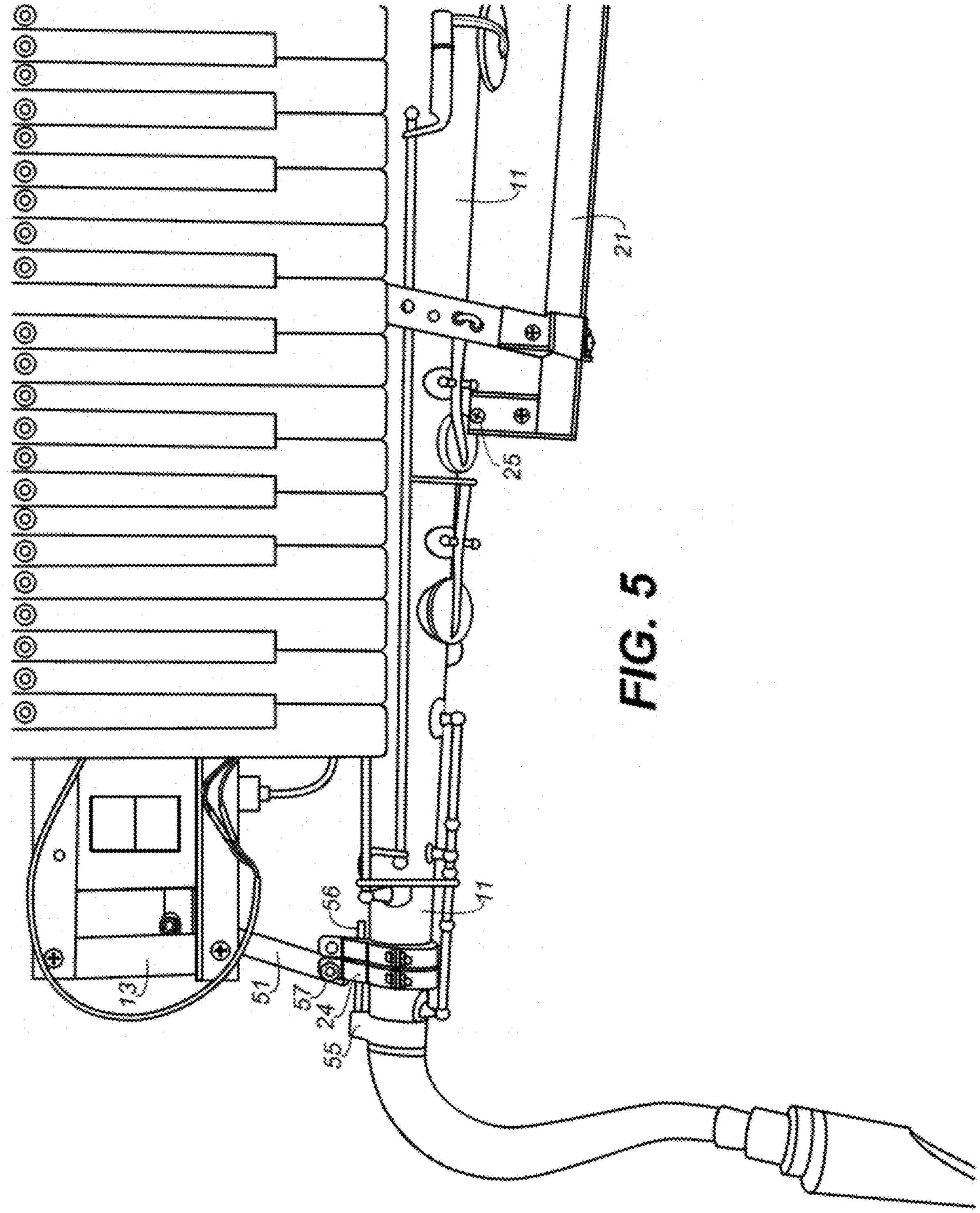
FIG. 5 shows detail of the attachment of the saxophone to the left of the framework.

FIG. 5 depicts a detailed view of the attachment of the top end of the saxophone 11 to support framework 13. The left side of the framework 13 is coupled to the saxophone 11 via the left strut 51 with mechanical fastener 57. In some examples, mechanical fastener 57 is a threaded blot and nut, or may be a quick release fastener, a snap, or other suitable mechanical fastener. The clamp 24 is prevented from rotating on the saxophone body by means of a rod 56 which is screwed into the saxophone lyre attachment by means a thumbscrew 55, assuring stable positioning of the support framework. The right side of FIG. 5 shows another view of top strut 21 coupling to saxophone 11 via strap-eye 25.

Figure 6:
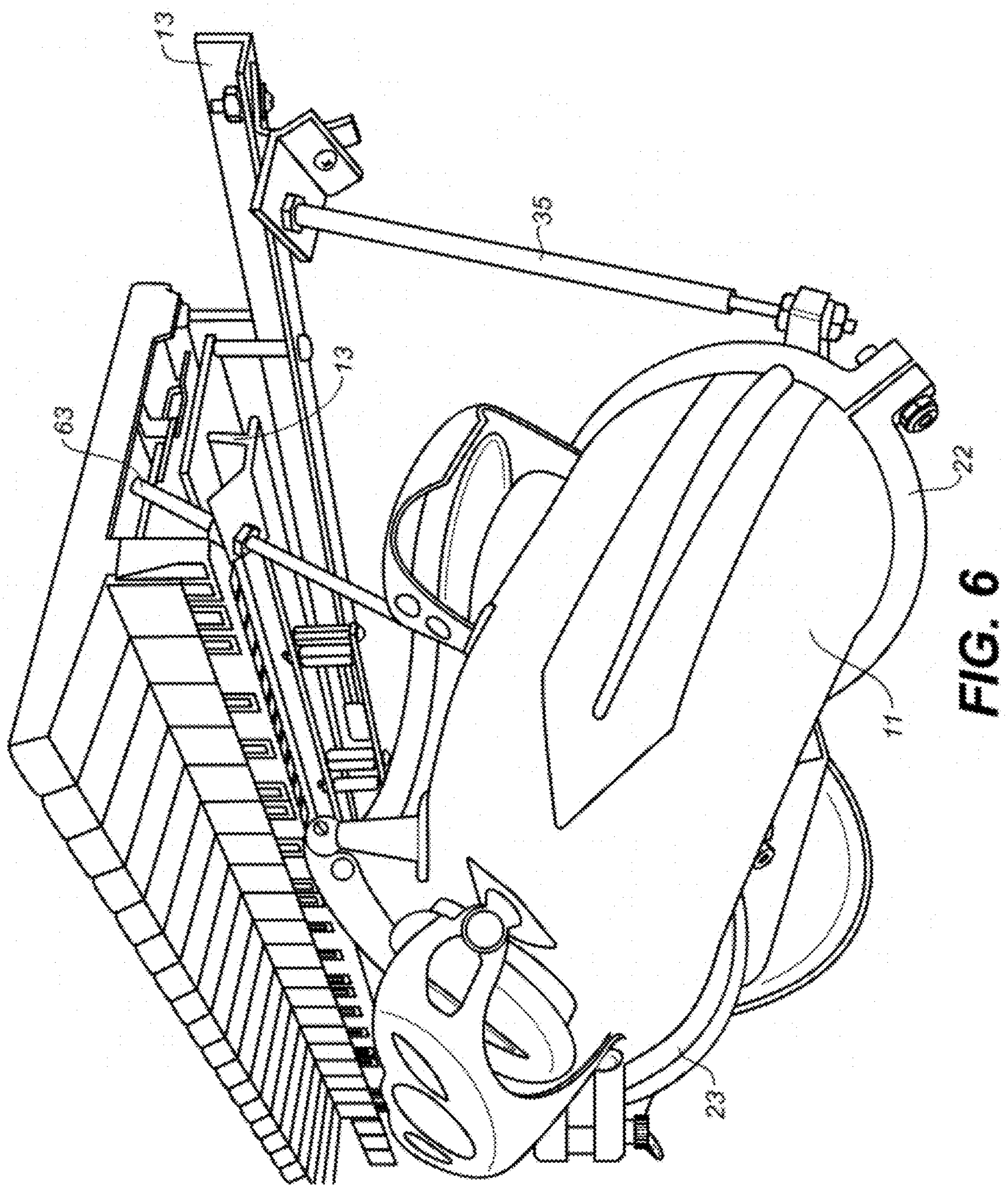
FIG. 6 shows detail of the attachment of the saxophone to the right of the framework.

FIG. 6 shows another view of the attachment of the right side of the framework 13 to the saxophone 11 via connection struts 35 and 63 and clamps 22 and 23, respectively.

Figure 7:
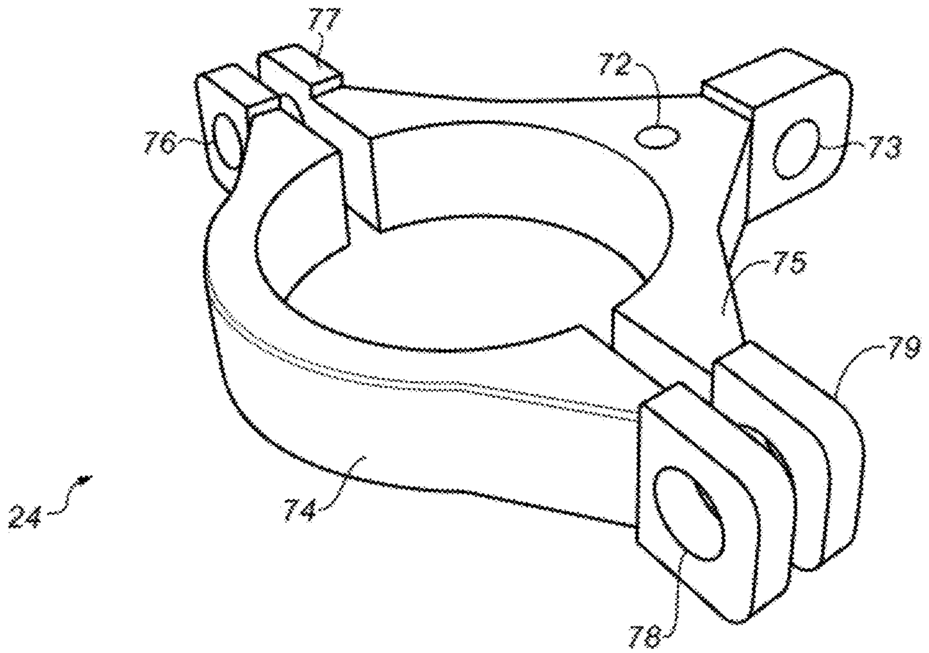
FIG. 7 shows detail of the left side clamp.
Figure 8:
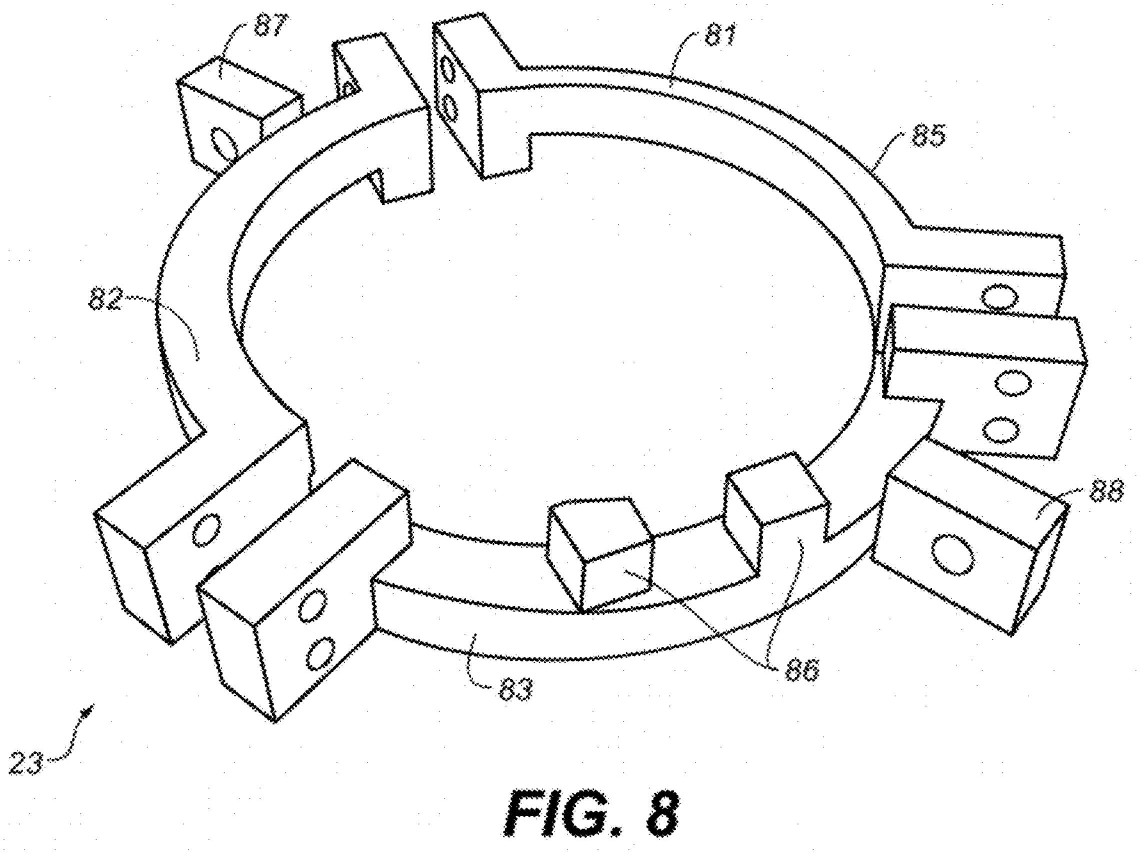
FIG. 8 shows detail of the right rear clamp.
Figure 9:
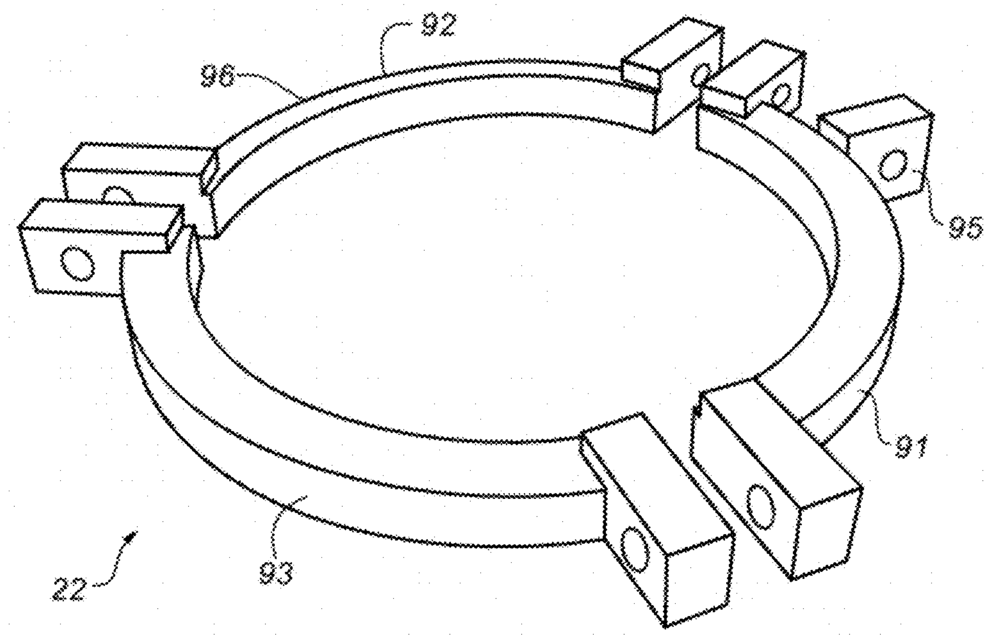
FIG. 9 shows detail of the right front clamp.

FIGS. 7, 8 and 9 show the various clamps used to attach the saxophone to the support framework in detail. FIG. 7 depicts clamp 24 which connects the left side strut 51 to the saxophone. Clamp 24 is formed from two halves 74 and 75 which are fit around the saxophone and are fixed in place by feeding a first bolt (not shown) through holes in ends 76 and 77 of clamp halves 74 and 75 respectively, and a second bolt (not shown) through holes in ends 78 and 79 of clamp halves 74 and 75 respectively. The hole 72 in clamp 24 is used to fit a rod 56 which connects to the lyre (sheet music holder) of the saxophone to prevent clamp 24 from rotating. Hole 73 in a protrusion of clamp 24 is used by mechanical fastener 57 to attach the left strut 51 to the clamp 24. In some examples, the mechanical fastener can be a threaded bolt and nut, a quick release fastener, a snap or other known mechanical fastener.

FIG. 8 shows the clamp 23 used to couple the back right side of the saxophone 11 to the support framework 13. The clamp 23 is fashioned in three pieces 81, 82, 83, to allow protrusions in the clamp to be concealed in the tubing of the bow (the 180-degree bend in the bottom of the sax, where the tubing changes direction) of the saxophone, and not catch the clothing of the player. One side of the clamp is beveled 85, so that there are no sharp angles where the saxophone body contacts the player. Alternatively, this edge could be radiused or otherwise smoothed. Blocks 86 formed as part of clamp section 83 engage posts located on the saxophone which act as anti-rotation features to prevent clamp 23 from rotating relative to the body of the saxophone. Protrusion 87 attached to clamp part 82 and protrusion 88 attached to clamp part 83 couple clamp 23 to strut 21 and to strut 63, via holes 88 and 89, respectively.

FIG. 9 shows clamp 22, used to couple the front right side of the saxophone 11 to the support framework 13. Clamp 22 is fashioned in three pieces 91, 92 and 93, to allow protrusions to be concealed in the tubing of the bow of the saxophone, and not catch the clothing of the player. One side of clamp piece 92 is beveled 96, so that there are no sharp angles where the saxophone body contacts the player. Alternatively, this edge could be radiused or otherwise smoothed. There is a protrusion 95 from clamp portion 91 which permits the attachment of strut 35 to framework 13.

The clamps 24, 23 and 22 shown in FIGS. 7, 8 and 9 and elsewhere may incorporate an interface material on their ID to contact the saxophone. The interface material may be a high coefficient of friction elastomeric material that helps distribute loads over the saxophone surface. The high coefficient of friction aids in keeping the clamp from slipping down the conical section of the saxophone. Clamps 24, 23 and 22 can be formed from a variety of materials. For example, the clamps may be formed from a polymeric material which can be 3D printed, injection molded or machined. Various thermoplastic or thermoset resins can be used as long as they have sufficient strength. For example, various polyolefins, polycarbonate, or other polymeric materials can be used. Polymeric materials may have additives to increase strength to allow less material to be used. For example, glass, Kevlar or carbon fibers may be embedded within the polymeric material to increase strength and reduce mass. Alternatively, clamps 24, 23 and 22 can be formed from metals such as steel, aluminum, brass or titanium.

Figure 10:
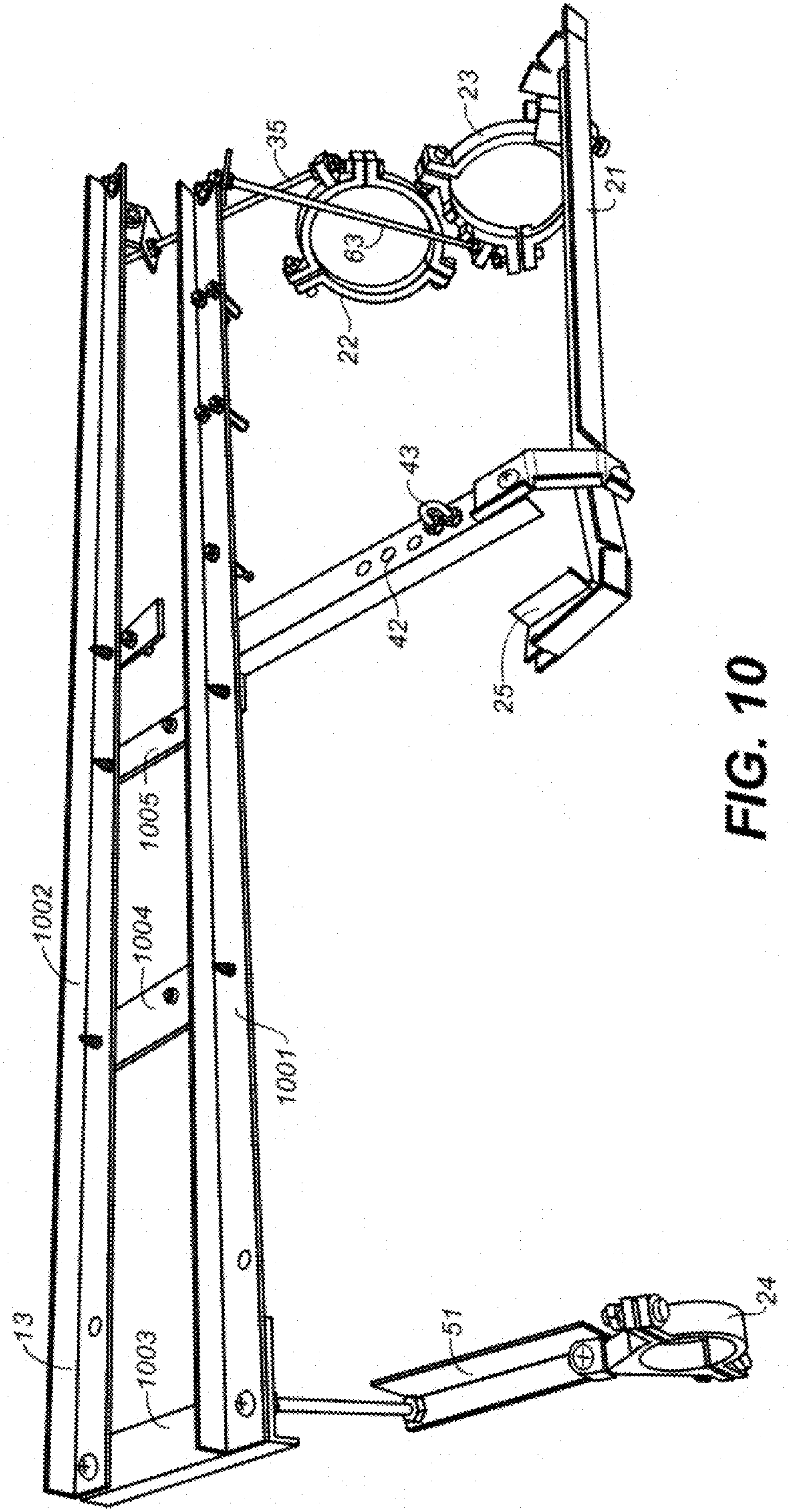
FIG. 10 shows detail of the framework.

FIG. 10 shows the framework 13 with the saxophone and the keyboard removed. The framework 13 consists of frame rails and cross braces, and the various struts and clamps. The left-side clamp 24 attaches to the left-side strut 51. The mid-strut 42 attaches the top strut 21 to the frame rail 1001, and also carries the adjustable saxophone attachment ring 43. The top strut 21 also attaches to the saxophone at two points: attachment point 25 is coupled to the original strap attachment on the sax, and right rear clamp 22 attaches to a right portion of the sax. Clamp 22 is also attached to the frame rail 1001 via strut 63. The right front clamp 23 attaches to frame rail 1002 via strut 35. Frame rails 1001 and 1002 are coupled together via cross braces 1003, 1004, and 1005.

The components of framework 13, including frame rails, cross braces and struts can be formed from a variety of materials. For example, framework components may be formed from polymeric extrusions cut to size, or may be 3D printed, injection molded or machined. Various thermoplastic or thermoset resins can be used as long as they have sufficient strength. For example, various polyolefins, polycarbonate, or other polymeric materials can be used. Polymeric materials may have additives to increase strength. For example, glass, Kevlar or carbon fibers may be embedded within the polymeric material to increase strength. Alternatively, the components of framework 13 can be formed from metals such as steel, aluminum, brass or titanium. The various framework components can be cut from metal extrusions and/or machined to form needed features.

Figure 11:
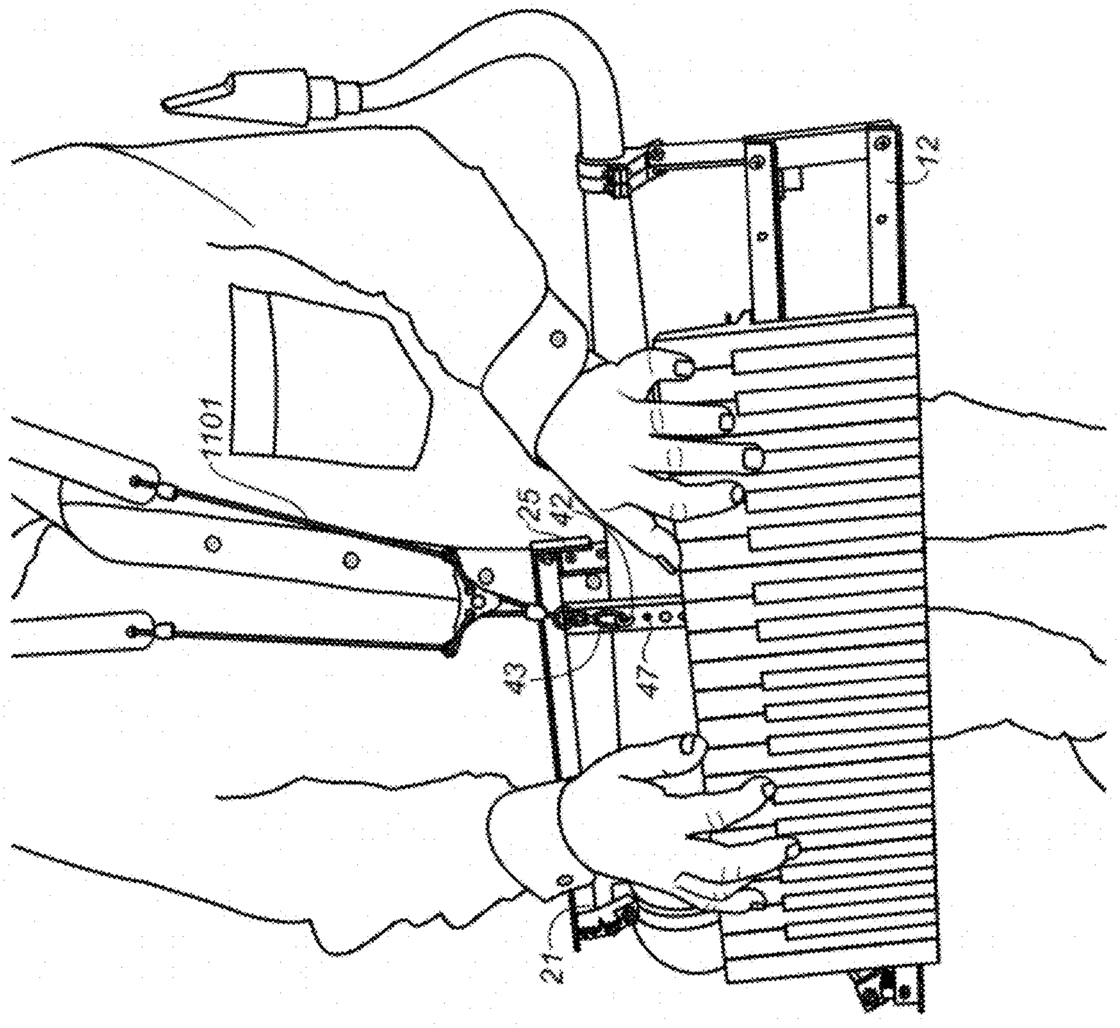
FIG. 11 shows one example in keyboard playing position.

FIG. 11 shows a complete assembly including a support framework with attached saxophone and keyboard as held by a player with the device in keyboard playing position. The players strap 1101 connects to the assembly at strap attachment ring 43. The player selects holes 47 along mid strut 42 for balance, to allow the assembly to be easily rotated from the position shown in FIG. 11 for playing the keyboard to the position shown in FIG. 12 for playing the saxophone. Generally, the player will adjust the assembly so that the strap 1101 attaches to a hole 47 that is located approximately in line with the center of mass of the complete assembly when the assembly is in either playing position, or is at or proximate the center of mass of the complete assembly.

Figure 12:
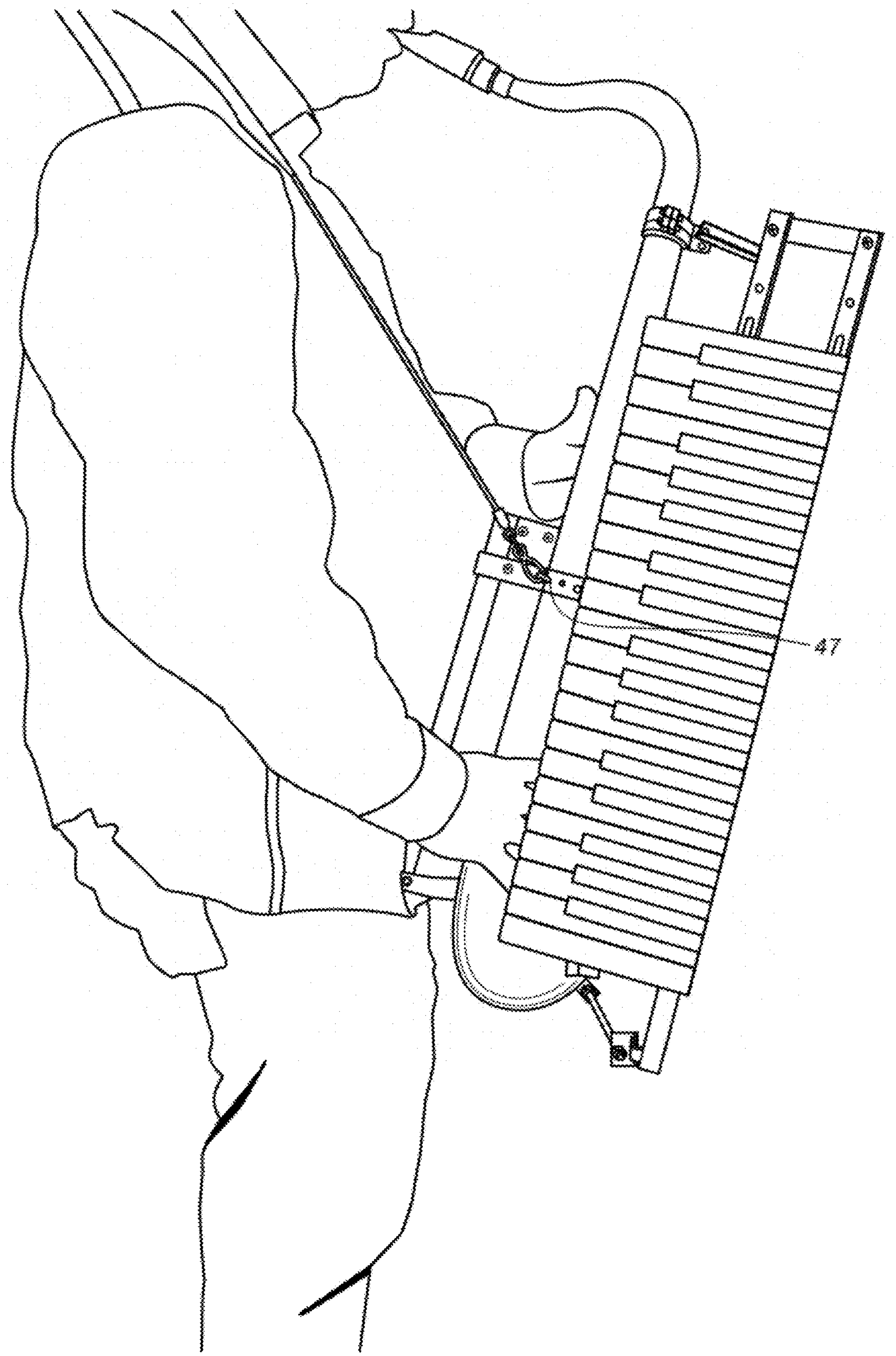
FIG. 12 shows one example in saxophone playing position

FIG. 12 shows the device as held by a player, with the device in saxophone playing position. The sax strap is shown as having pivoted to the sax playing position on attachment eye A number of implementations have been described. Nevertheless, it will be understood that additional modifications may be made without departing from the scope of the inventive concepts described herein, and, accordingly, other embodiments are within the scope of the following claims.

What is claimed is:

1. An apparatus for attaching a saxophone and a hand actuated music controller, comprising:

a support framework, wherein the support framework comprises a first plurality of coupling structures constructed and arranged to removably clamp the saxophone to the support framework, and;

a second plurality of coupling structures to removably couple the hand actuated controller to the support framework, wherein a first coupling structure of the first plurality of coupling structures is configured for coupling to the saxophone at a first location on a lower section of the saxophone, the lower section of the saxophone comprising the portion of the saxophone located below a center of mass of a complete assembly, the complete assembly comprising the saxophone, the framework and the hand actuated music controller, when the complete assembly is in a saxophone playing position, and wherein a second coupling structure of the first plurality of coupling structures is configured for coupling to the saxophone at a second location on an upper section of the saxophone, the upper section comprising the portion of the saxophone located above the center of mass of the complete assembly when the complete assembly is in the saxophone playing position.

2. The apparatus of claim 1 wherein the first plurality of coupling structures comprises circumferential clamps to facilitate the attachment of support framework to the saxophone.

3. The apparatus of claim 2 wherein at least one of the circumferential clamps comprises anti-rotation features to keep the at least one circumferential clamp from rotating relative to the saxophone.

4. The apparatus of claim 2 wherein at least one of the circumferential clamps comprises a beveled, radiused or smoothed edge.

5. The apparatus of claim 2 wherein the circumferential clamps are formed from a plurality of semi-circular sections.

6. The apparatus of claim 1 wherein the second plurality of coupling structures comprises a quick-release mechanism to facilitate the removal of the hand actuated controller from the framework.

7. The apparatus of claim 1 wherein the support framework further comprises an attachment eye for attaching a neck strap to the support framework.

8. The apparatus of claim 7 wherein the location of the attachment eye on the support framework is adjustable.

9. The apparatus of claim 8 wherein the location of the eye is adjusted by choosing at least one hole in the support framework in which to locate the attachment eye.

10. The apparatus of claim 7 wherein the attachment eye is located in line with the center of mass of a combined assembly comprising the support framework, the saxophone and the hand actuated controller, to facilitate rotating the combined assembly about the attachment eye.

11. The apparatus of claim 8 wherein the attachment eye is located at the center of mass of a combined assembly comprising the support framework, the saxophone and the hand actuated controller.

12. The apparatus of claim 1 wherein the hand actuated controller is a keyboard.

13. The apparatus of claim 12 wherein the keyboard comprises unweighted keys.

14. The apparatus of claim 12 wherein the keyboard is lightweighted.

15. The apparatus of claim 12 wherein the keyboard comprises a wireless data connection to sound synthesis and/or sound amplification equipment.

16. The apparatus of claim 1 wherein the position of the saxophone relative to the support framework is adjustable.

17. The apparatus of claim 16 wherein the position of the hand actuated controller relative to the support framework is adjustable.

18. A method for using a saxophone and a hand actuated controller by a musician comprising:

adjusting a relative position of the saxophone to a support framework, coupling the saxophone and the hand actuated controller to the support framework, wherein a first coupling structure is configured for coupling the support network to a lower section of the saxophone, the lower section of the saxophone comprising the portion of the saxophone located below a center of mass of a complete assembly, the complete assembly comprising the saxophone, the framework and the hand actuated music controller, when the complete assembly is in a saxophone playing position, wherein a second coupling structure is configured for coupling the support network to an upper section of the saxophone, the upper section of the saxophone comprising the portion of the saxophone located above the center of mass of a complete assembly when the complete assembly is in the saxophone playing position, placing a neck strap around a neck of the musician, attaching the neck strap to the support framework at an attachment point, and;

rotating the framework about the attachment point to position either the saxophone or the hand actuated controller in a proper orientation for playing by the musician.

19. The apparatus of claim 1 wherein the hand actuated controller comprises the support framework.

* * * * *